(12) United States Patent
Endo

(10) Patent No.: US 11,923,999 B2
(45) Date of Patent: Mar. 5, 2024

(54) MANAGEMENT APPARATUS, METHOD FOR ALLOCATING IDENTIFICATION INFORMATION OF ONBOARD APPARATUS, ONBOARD SYSTEM, AND DATA STRUCTURE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Masahiro Endo, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/759,084

(22) PCT Filed: Jan. 12, 2021

(86) PCT No.: PCT/JP2021/000687
§ 371 (c)(1),
(2) Date: Jul. 19, 2022

(87) PCT Pub. No.: WO2021/149537
PCT Pub. Date: Jul. 29, 2021

(65) Prior Publication Data
US 2023/0058027 A1 Feb. 23, 2023

(30) Foreign Application Priority Data
Jan. 21, 2020 (JP) .................. 2020-007269

(51) Int. Cl.
*H04L 12/28* (2006.01)

(52) U.S. Cl.
CPC .................. *H04L 12/28* (2013.01)

(58) Field of Classification Search
CPC ...................................... H04L 12/28
(Continued)

(56) References Cited

U.S. PATENT DOCUMENTS

| | | | |
|---|---|---|---|
| 2010/0329272 A1* | 12/2010 | Tsuboi | H04L 12/66 370/401 |
| 2017/0142064 A1* | 5/2017 | Weis | H04L 63/061 |
| 2019/0116157 A1 | 4/2019 | Kishikawa et al. | |

FOREIGN PATENT DOCUMENTS

| | | |
|---|---|---|
| JP | 2006-90038 A | 4/2006 |
| JP | 2012-48424 A | 3/2012 |

(Continued)

OTHER PUBLICATIONS

International Search Report, Application No. PCT/JP2021/000687, dated Apr. 6, 2021. ISA/Japan Patent Office.

*Primary Examiner* — James E Springer
(74) *Attorney, Agent, or Firm* — Honigman LLP

(57) ABSTRACT

Provided is a management apparatus that assigns identification information to an onboard apparatus connected to an onboard network including a reception unit configured to receive, from an onboard apparatus, a request frame with identification information assigned including a unique ID for the onboard apparatus; a generation unit configured to generate a response frame including identification information allocated to the request frame received by the reception unit; and a transmission unit configured to transmit the response frame generated by the generation unit to the onboard apparatus which is a transmission source of the request frame.

13 Claims, 17 Drawing Sheets

(58) Field of Classification Search
USPC .......................................................... 709/245
See application file for complete search history.

(56) References Cited

FOREIGN PATENT DOCUMENTS

| | | | | |
|---|---|---|---|---|
| JP | 2012-222527 | A | 11/2012 | |
| JP | 2015-179375 | A | 10/2015 | |
| JP | 2017-91049 | A | 5/2017 | |
| JP | 2020191614 | A * | 11/2020 | |
| KR | 20160123174 | A * | 10/2016 | ......... H04L 61/2046 |

* cited by examiner

FIG. 4

| CAN ID | ch | | | | |
|---|---|---|---|---|---|
| | 0 | 1 | 2 | 3 | 4 |
| 100 | r | | s | s | |
| 110 | r | s | s | | |
| 200 | | r | s | | |
| 250 | | r | s | | |
| 300 | | | r | | s |

FIG. 11

| Channel | Apparatus ID |
|---|---|
| 0 | 0x00 − 0x2F |
| 1 | 0x30 − 0x5F |
| 2 | 0x60 − 0x8F |
| 3 | 0x90 − 0xBF |
| 4 | 0xC0 − 0xEF |

FIG. 12

| CAN ID | Apparatus ID | ch | | | | |
|---|---|---|---|---|---|---|
| | | 0 | 1 | 2 | 3 | 4 |
| 100 | 0x10 | r | | s | s | |
| 110 | 0x10 | r | s | s | | |
| 200 | 0x40 | | r | s | | |
| 210 | – | | | | | |
| 250 | 0x50 | | r | s | | |
| 300 | 0x70 | | | r | | s |
| 350 | – | | r | | s | |
| ⋮ | ⋮ | | | | | |

MANAGEMENT APPARATUS, METHOD FOR ALLOCATING IDENTIFICATION INFORMATION OF ONBOARD APPARATUS, ONBOARD SYSTEM, AND DATA STRUCTURE

CROSS-REFERENCE TO RELATED APPLICATIONS

This application is the U.S. national stage of PCT/JP2021/000687 filed on Jan. 12, 2021, which claims priority of Japanese Patent Application No. JP 2020-007269 filed on Jan. 21, 2020, the contents of which are incorporated herein.

TECHNICAL FIELD

The present disclosure relates to a management apparatus, a method for allocating identification information of an onboard apparatus, an onboard system, and a data structure.

BACKGROUND

Onboard apparatuses connected to an onboard network are allocated with a unique identification number. With onboard network communication protocols, such as Controller Area Network and FlexRay, use a CAN ID or frame ID as identification information for onboard apparatuses.

Identification information must be uniquely set in the onboard network. For example, in a case where an onboard apparatus is added to the onboard network, the newly added onboard apparatus must be allocated with identification information that is different from that of the other onboard apparatuses.

In JP 2012-222527A, a method for dynamically assigning an identification number to electronic control units (ECU) in an onboard network is described. In the method described in JP 2012-222527A, each ECU stores a common number table in which a plurality of integer numbers are registered, selects one number from the common number table, and transmits the selected number and its unique ID to a management ECU. The management ECU determines whether or not there are numbers which are the same in the numbers transmitted by the ECUs and, in a case where no two numbers are the same, allocates the transmitted numbers as the identification numbers of the ECUs and, in a case where any two numbers are the same, allocates the number to the ECU with the lowest unique ID. For the ECU with the unique ID which is not the lowest, the ECU determines the number again and transmits this to the management ECU.

In the method described in JP 2012-222527A, when many ECUs simultaneously request for an identification number to be assigned, there is a high likelihood of the same number being used. In other words, because the ECU cannot identify what number was determined for another ECU, it is plausible that the same number is determined for a plurality of ECUs. When the same number is used, the ECU with a unique ID which is not the lowest needs to request to be assigned with a number again, increasing the time needed to assign numbers. Also, in some cases, a single ECU may request to be assigned with a plurality of identification numbers. In this case also, there is a high likelihood that the same number is used, and it is plausible that the time needed for number assignment is increased.

SUMMARY

A method for allocating identification information for an onboard apparatus according to an aspect of the present disclosure is a method for allocating identification information for an onboard apparatus connected to an onboard network including receiving, via a management apparatus connected to the onboard network and from an onboard apparatus, a request frame with identification information assigned including a unique ID for the onboard apparatus; generating, via the management apparatus, a response frame including identification information allocated to the received request frame; and transmitting, via the management apparatus, the generated response frame to the onboard apparatus which is a transmission source of the request frame.

An onboard system according to an aspect of the present disclosure includes a management apparatus connected to an onboard network; and an onboard apparatus connected to the onboard network, wherein the onboard apparatus includes a first transmission unit configured to transmit a request frame with identification information assigned including a unique ID for the onboard apparatus; the management apparatus includes a second reception unit configured to receive the request frame transmitted from the onboard apparatus, a generation unit configured to generate a response frame including identification information allocated to the request frame received by the second reception unit, and a second transmission unit configured to transmit the response frame generated by the generation unit to the onboard apparatus which is a transmission source of the request frame; and the onboard apparatus includes a first reception unit configured to receive the response frame transmitted from the management apparatus, and a setting unit configured to set identification information included in the response frame received by the first reception unit as identification information of the onboard apparatus.

A data structure according to an aspect of the present disclosure is a data structure used in a request frame for an onboard apparatus connected to an onboard network to request allocation of identification information including an ID region; and a data region, wherein the ID region stores common identification information in the onboard network; and the data region stores a unique ID for an onboard apparatus which requests allocation of identification information and the number of requests for the identification information.

A data structure according to another aspect of the present disclosure is a data structure used in a response frame for responding to a request for identification information allocation by an onboard apparatus connected to an onboard network including an ID region; and a data region, wherein the ID region stores common identification information in the onboard network; the data region stores a unique ID for an onboard apparatus which requests allocation of identification information and identification information allocated to the onboard apparatus; and the data region stores the number of pieces of the identification information requested from the onboard apparatus.

The present disclosure can not only be implemented as a management apparatus with the advantageous configuration described above, but can also be implemented as a method for allocating identification information for an onboard apparatus with an advantageous processing process executed by a management apparatus or as a computer program for causing a computer to execute this process. A portion of all of the management apparatus can be implemented as a semiconductor integrated circuit or as an onboard system including a management apparatus. Also, the present disclosure can be implemented as a data structure used in the method for allocating identification information for an onboard apparatus described above.

Effects of Present Disclosure

According to the present disclosure, in a case where a plurality of onboard apparatuses simultaneously request for allocation of identification information or in a case where one onboard apparatus requests for allocation of a plurality of identification information, an increase in the time needed to allocate the identification numbers can be suppressed.

BRIEF DESCRIPTION OF DRAWINGS

FIG. 4 is a diagram illustrating an example of the configuration of a relay table.

FIG. 11 is a diagram illustrating an example of the configuration of a channel management table.

FIG. 12 is a diagram illustrating an example of the configuration of an ID database.

DETAILED DESCRIPTION OF PREFERRED EMBODIMENTS

Figure 1:
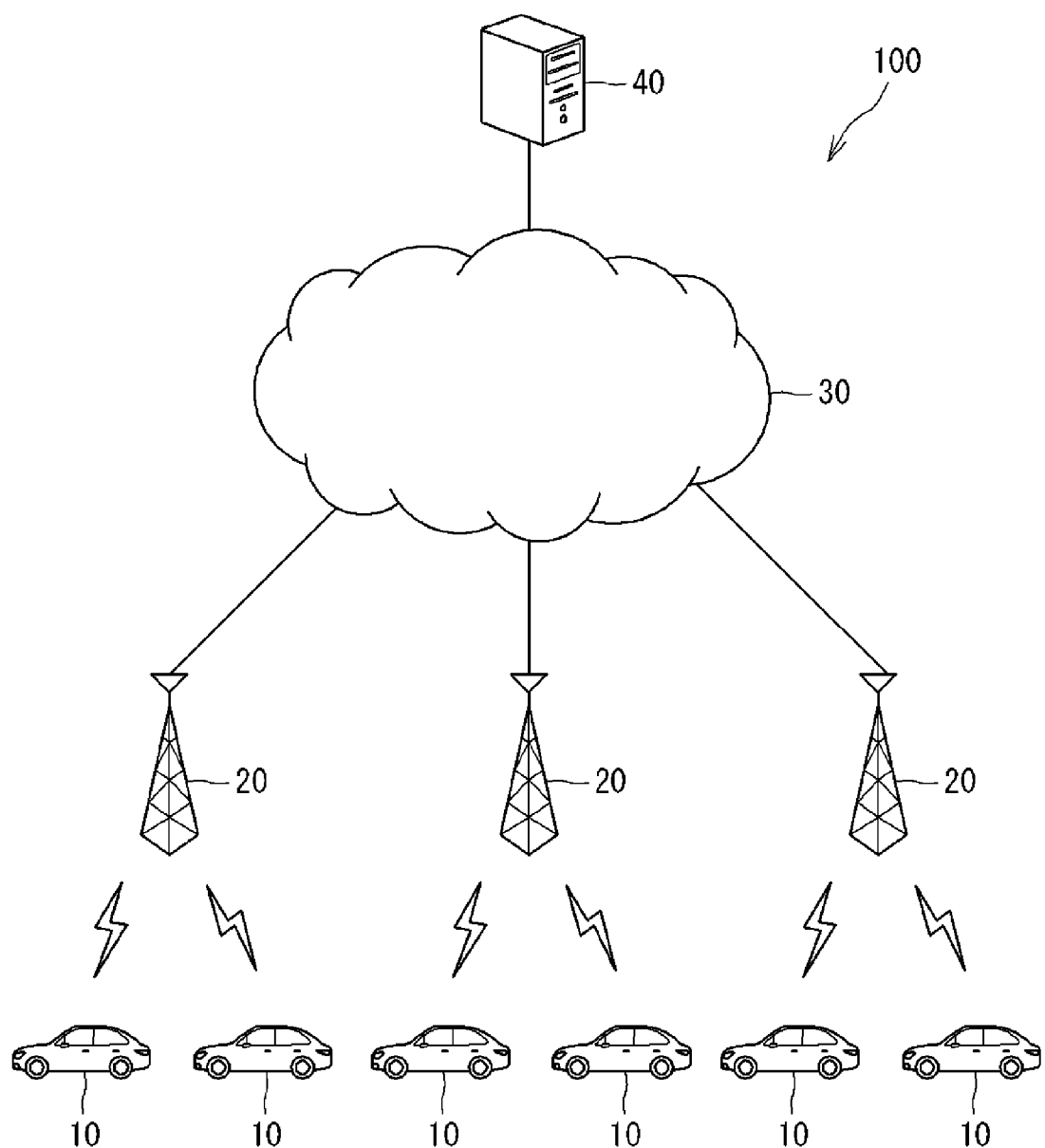
FIG. 1 is a schematic diagram for describing an example of an identification information management system according to an embodiment.

Embodiments of the present disclosure are outlined and listed below.

A management apparatus according to the present embodiment is a management apparatus that assigns identification information to an onboard apparatus connected to an onboard network including a reception unit configured to receive, from an onboard apparatus, a request frame with identification information assigned including a unique ID for the onboard apparatus; a generation unit configured to generate a response frame including identification information allocated to the request frame received by the reception unit; and a transmission unit configured to transmit the response frame generated by the generation unit to the onboard apparatus which is a transmission source of the request frame. In this manner, in response to the request frame transmitted from the onboard apparatus, an apparatus different to the onboard apparatus, can allocate identification information to onboard apparatuses so that they are not the same. In other words, because the identification-information-allocating apparatus can identify the identification information allocated to each onboard apparatus, the apparatus can make sure that the identification information allocated to one onboard apparatus is not allocated to another onboard apparatus. Accordingly, in a case where a plurality of onboard apparatuses simultaneously request for allocation of identification information or in a case where one onboard apparatus requests for allocation of a plurality of identification information, an increase in the time needed to allocate the identification numbers can be suppressed.

In the management apparatus according to the present embodiment, the request frame may further include the number of pieces of requested identification information, and the response frame may include different identification information corresponding to the number. In this manner, a plurality of identification information can be assigned to one onboard apparatus.

In the management apparatus according to the present embodiment, the response frame may include a normal response frame and an abnormal response frame, the generation unit, in a case where the identification information is allocated, may generate the normal response frame including the allocated identification information, the generation unit, in a case where the identification information is not allocated, may generate the abnormal response frame not including the identification information, and the transmission unit may transmit the normal response frame or the abnormal response frame generated by the generation unit to the onboard apparatus which is the transmission source. In this manner, in a case where the onboard apparatus receives a normal response frame, the onboard apparatus can acquire identification information included in a normal response frame. In a case where the onboard apparatus receives an abnormal response frame, the onboard apparatus, without acquiring identification information, can perform the necessary measures, such as re-transmitting a request frame.

The management apparatus according to present embodiment may further include a storage unit configured to store a correspondence table indicating a correspondence relationship between a unique ID of an onboard apparatus and a channel of a network bus which an onboard apparatus connects to; and a connection status determination unit configured to determine whether or not a correspondence relationship between the unique ID included in the request frame received by the reception unit and a channel of a network bus that transmitted the request frame and a correspondence relationship indicated in the correspondence table match, wherein the generation unit, in a case where the correspondence relationship between the unique ID included in the request frame and the channel that transmitted the request frame and the correspondence relationship indicated in the table are determined to match by the connection status determination unit, generates the normal response frame; and the generation unit, in a case where the correspondence relationship between the unique ID included in the request frame and the channel that transmitted the request frame and the correspondence relationship indicated in the table are determined not to match by the connection status determination unit, generates the abnormal response frame. In this manner, in a case where the onboard apparatus is not connected to the correct channel, a connection abnormality notification can be sent by transmitting the abnormal response frame, without allocating identification information to the onboard apparatus.

In the management apparatus according to the present embodiment, the request frame may include common identification information which is common identification information in the onboard network and identification information dedicated to identification information allocation. The frame defined by the onboard network protocol includes a region for storing the identification information of the onboard apparatus, but does not include the identification information to be stored in the onboard apparatus before identification information allocation. Thus, because the request frame stores common identification information, the identification information of the onboard apparatus is not needed, and an onboard apparatus, such as the management apparatus, which received a request frame can recognize the frame as a frame to use in identification information allocation.

In the management apparatus according to the present embodiment, the request frame may further include an identifier dedicated to requesting the identification information. Accordingly, an onboard apparatus, such as the management apparatus, which received the request frame can identify request frames and response frames.

In the management apparatus according to the present embodiment, the response frame may include the common identification information. Accordingly, the onboard apparatus which received the response frame can recognize the frame as a frame to use in identification information allocation.

In the management apparatus according to the present embodiment, the response frame may further include an identifier dedicated to responding to a request for the identification information. Accordingly, the onboard apparatus which received the response frame can identify request frames and response frames.

The management apparatus according to the present embodiment may further include an allocation unit configured to allocate identification information to the request frame received by the reception unit. Accordingly, the management apparatus can allocate identification information to a request frame without querying an external apparatus.

A method for allocating identification information for an onboard apparatus according to the present embodiment is a method for allocating identification information for an onboard apparatus connected to an onboard network including receiving, via a management apparatus connected to the onboard network and from an onboard apparatus, a request frame with identification information assigned including a unique ID for the onboard apparatus; generating, via the management apparatus, a response frame including identification information allocated to the received request frame; and transmitting, via the management apparatus, the generated response frame to the onboard apparatus which is a transmission source of the request frame. In this manner, in response to the request frame transmitted from the onboard apparatus, an apparatus different from the onboard apparatus, can allocate identification information to onboard apparatuses so that they are not the same. In other words, because the identification-information-allocating apparatus can identify the identification information allocated to each onboard apparatus, the apparatus can make sure that the identification information allocated to one onboard apparatus is not allocated to another onboard apparatus. Accordingly, in a case where a plurality of onboard apparatuses simultaneously request for allocation of identification information or in a case where one onboard apparatus requests for allocation of a plurality of identification information, an increase in the time needed to allocate the identification numbers can be suppressed.

An onboard system according to the present embodiment includes a management apparatus connected to an onboard network; and an onboard apparatus connected to the onboard network, wherein the onboard apparatus includes a first transmission unit configured to transmit a request frame with identification information assigned including a unique ID for the onboard apparatus, the management apparatus includes: a second reception unit configured to receive the request frame transmitted from the onboard apparatus; a generation unit configured to generate a response frame including identification information allocated to the request frame received by the second reception unit; and a second transmission unit configured to transmit the response frame generated by the generation unit to the onboard apparatus which is a transmission source of the request frame, and the onboard apparatus includes: a first reception unit configured to receive the response frame transmitted from the management apparatus; and a setting unit configured to set identification information included in the response frame received by the first reception unit as identification information of the onboard apparatus. In this manner, in response to the request frame transmitted from the onboard apparatus, an apparatus different from the onboard apparatus, can allocate identification information to onboard apparatuses so that they are not the same. In other words, because the identification-information-allocating apparatus can identify the identification information allocated to each onboard apparatus, the apparatus can make sure that the identification information allocated to one onboard apparatus is not allocated to another onboard apparatus. Accordingly, in a case where a plurality of onboard apparatuses simultaneously request for allocation of identification information or in a case where one onboard apparatus requests for allocation of a plurality of identification information, an increase in the time needed to allocate the identification numbers can be suppressed.

A data structure according to the present embodiment is a data structure used in a request frame for an onboard apparatus connected to an onboard network to request allocation of identification information including an ID region; and a data region, wherein the ID region stores common identification information in the onboard network, and the data region stores a unique ID for an onboard apparatus which requests allocation of identification information and the number of requests for the identification information. Accordingly, an onboard apparatus, such as the management apparatus, which received the request frame can recognize the frame as a request frame and can identify the number of identification information needed. In this manner, the needed number of identification information can be assigned to the onboard apparatus which transmitted the request frame.

A data structure according to the present embodiment is a data structure used in a response frame for responding to a request for identification information allocation by an onboard apparatus connected to an onboard network including an ID region; and a data region, wherein the ID region stores common identification information in the onboard network, the data region stores a unique ID for an onboard apparatus which requests allocation of identification information and identification information allocated to the onboard apparatus, and the data region stores the number of pieces of the identification information requested from the onboard apparatus. In this manner, the onboard apparatus which received the response frame can recognize the frame as a response frame and can assign one or a plurality of identification information all at once to one onboard apparatus.

Embodiments of the present disclosure will be described in detail below with reference to the drawings. Note that two or more parts of the embodiments described below may be combined in a discretionary manner.

1. IDENTIFICATION INFORMATION MANAGEMENT SYSTEM

An identification information management system according to the present embodiment is a system for managing the identification information of an onboard apparatus connected to an onboard network installed in a vehicle. The identification information is used to identify each onboard apparatus (node) on the onboard network. For example, in a CAN bus network, the identification information is a CAN ID. In the present embodiment, CAN ID is used as the identification information. Note that the identification information is not limited to being a CAN ID. For example, in FlexRay, an ID of an onboard apparatus included in a frame ID is the identification information, and, in a Local Interconnect Network (LIN), an ID of an onboard apparatus including in a Protected Identifier (PID) field of a header is the identification information.

FIG. 1 is a schematic diagram for describing an example of an identification information management system according to the present embodiment.

An identification information management system 100 includes a plurality of vehicles 10 and a server 40. Each vehicle 10 is installed with a wireless communication unit (an outside-vehicle communication unit 202 described below) and is capable of wirelessly communicating with a base station 20 (or a roadside unit). The base stations 20 are connected to an Internet 30, and the server 40 is also connected to the Internet 30. The vehicles 10 are capable of data communication with the server 40.

The server 40 includes a database (ID database 406, see FIG. 5) and stores the CAN IDs allocated to each onboard apparatus for each vehicle 10. In a case where a CAN ID needs to be assigned to an onboard apparatus, such as when a new onboard apparatus is connected to the onboard network, the vehicle 10 sends a request to the server 40 for CAN ID allocation. In response to the request, the server 40 allocates the onboard apparatus with a CAN ID and registers the CAN ID in the database. The server 40 transmits the allocated CAN ID to the vehicle 10 which is the request source. In this manner, the CAN IDs of the onboard apparatuses for each vehicle 10 are managed.

2. ONBOARD SYSTEM

Figure 2:
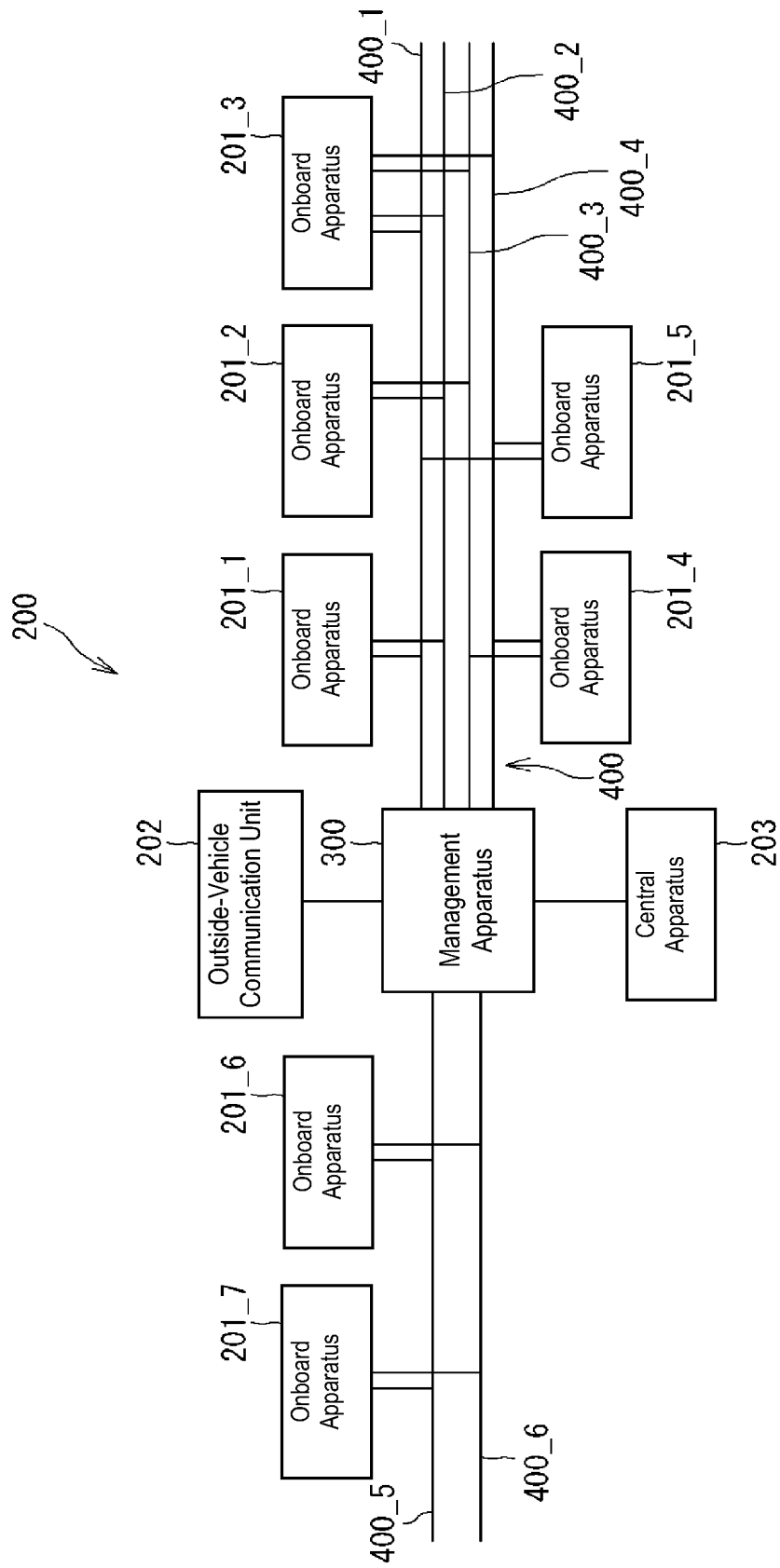
FIG. 2 is a block diagram illustrating an example of the configuration of an onboard system according to an embodiment.

FIG. 2 is a block diagram illustrating an example of the configuration of an onboard system according to the present embodiment.

An onboard system 200 is provided with onboard apparatuses 201_1, 201_2, 201_3, and so on; a management apparatus 300; and the outside-vehicle communication unit 202, for example. Note that hereinafter, the onboard apparatuses 201_1, 201_2, 201_3, and so on are collectively referred to as the onboard apparatuses 201.

The onboard apparatuses 201 are, for example, control apparatuses for the powertrain or drivetrain, such as an engine control apparatus, an inverter control apparatus, a steering control apparatus, a brake control apparatus, and the like, and control apparatuses for in-vehicle equipment, such as an air conditioner control apparatus, a navigation apparatus, a display apparatus, an interior light control apparatus, a power window control apparatus, and the like.

The onboard apparatuses 201 are connected to an onboard network 400. The onboard network 400 includes a plurality of CAN buses. Each CAN bus is an independent data transmission line and a communication channel. In the example illustrated in FIG. 2, the onboard network 400 includes six channels 400_1, 400_2, 400_3, 400_4, 400_5, and 400_6. Each onboard apparatus 201 is connected to at least one of the channels 400_1, 400_2, 400_3, 400_4, 400_5, or 400_6. In the example illustrated in FIG. 2, the onboard apparatus 201_1 is connected to the channels 400_1 and 400_2, the onboard apparatus 201_2 is connected to the channels 400_2 and 400_3, the onboard apparatus 201_3, is connected to the channels 400_1, 400_2, 400_3, and 400_4, the onboard apparatus 201_4 is connected to the channels 400_3 and 400_4, the onboard apparatus 201_5 is connected to the channels 400_2 and 400_4, and the onboard apparatuses 201_6, 201_7, and 201_8 are connected to the channels 400_5 and 400_6.

The management apparatus 300 receives request frames from the onboard apparatuses 201 and sends requests to the server 40 for CAN ID allocation. When a CAN ID is received from the server 40, the management apparatus 300 generates a response frame including the allocated CAN ID and transmits this to the onboard apparatus 201 which is the request source. In other words, the management apparatus 300 is an intermediary between the onboard apparatuses 201 and the server 40.

The management apparatus 300 is connected to the channels 400_1, 400_2, and 400_3 of the onboard network 400. The management apparatus 300 is a relay apparatus for relaying communications between the onboard apparatuses 201 connected to different channels. Also, when a request frame is received from the onboard apparatus 201, the management apparatus 300 executes connection status determination processing to determine whether or not the channel which the transmission source onboard apparatus 201 is connected to and the channel which the same onboard apparatus 201 should connect to are the same. In a case where the connection status is normal, in other words, the onboard apparatus 201 is connected to the correct channel, the management apparatus 300 generates a normal response frame including the allocated CAN ID and transmits the normal response frame to the onboard apparatus 201 which is the request frame transmission source. On the other hand, in a case where the onboard apparatus 201 is not connected to the correct channel, the management apparatus 300 generates an abnormal response frame not including a CAN ID and transmits the abnormal response frame to the onboard apparatus 201 which is the request frame transmission source.

The outside-vehicle communication unit 202 is connected to the management apparatus 300. The outside-vehicle communication unit 202 is capable of wireless communication. The outside-vehicle communication unit 202 wirelessly communicates with an outside-vehicle apparatus, such as a terminal, the server 40, or the like, via the base station 20.

A central apparatus 203 is connected to the management apparatus 300. The central apparatus 203 is provided with a user interface, in other words, an input unit such as a touch sensor, a switch, or a microphone, and an output unit such as a monitor or a speaker. In a case where the user is notified of an abnormality or the like, the management apparatus 300 transmits an output command to the central apparatus 203. In response to this, the central apparatus 203 outputs a screen or speech.

3. CONFIGURATION OF MANAGEMENT APPARATUS

Figure 3:
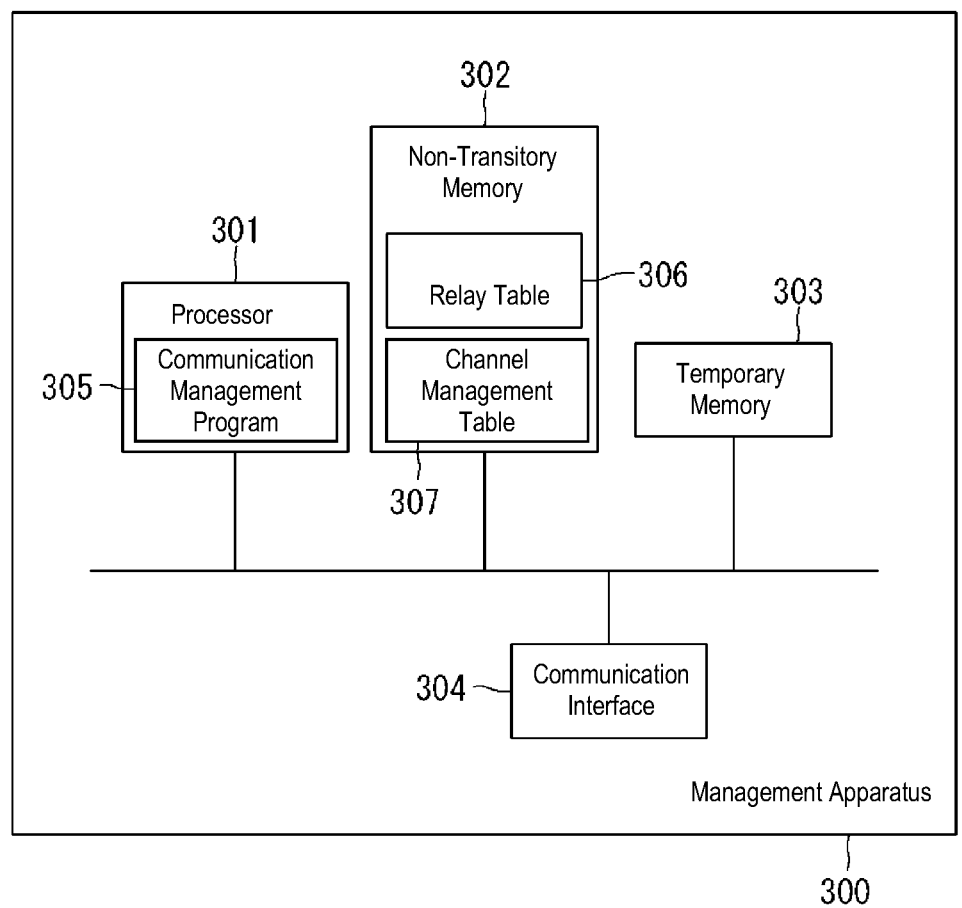
FIG. 3 is a block diagram illustrating an example of the configuration of a management apparatus according to an embodiment.

FIG. 3 is a block diagram illustrating an example of the configuration of a management apparatus according to the present embodiment. In this specific example, the management apparatus 300 is provided with a processor 301, a non-transitory memory 302, a temporary memory 303, and a communication interface 304.

The temporary memory 303 is a volatile memory, such as a Static Random Access Memory (SRAM), a Dynamic Random Access Memory (DRAM), and the like. The non-transitory memory 302 is a non-volatile memory, such as a flash memory, a hard disk, a Read Only Memory (ROM), and the like. The non-transitory memory 302 stores a communication management program 305, which is a computer program, and data used to execute the communication management program 305. The management apparatus 300 is provided with a computer, and the functions of the management apparatus 300 are implemented by the processor 301, which is the CPU, executing the communication management program 305, which is a computer program, stored in the storage apparatus of the computer. The communication management program 305 is able to be stored in a recording medium, such as a flash memory, a ROM, a CD-ROM, and the like. The processor 301 executes the communication management program 305 and executes the communication management processing described below.

Note that the processor 301 is not limited to being a CPU. The processor 301, for example, may be a hardware logic circuit, such as an Application Specific Integrated Circuit (ASIC), a gate array, a Field-Programmable Gate Array (FPGA), and the like. In such cases, the hardware logic circuit is configured to execute processing similar to that of the communication management program 305.

The non-transitory memory 302 includes a relay table 306 and a channel management table 307. The relay table 306 is a table for managing the channels used for each CAN ID. FIG. 4 is a diagram illustrating an example of the configuration of the relay table 306. For example, in the relay table 306, the CAN IDs are associated together with channels used to send and receive frames. In FIG. 4, r represents a channel used by the management apparatus 300 to receive a frame, and s represents a channel used by the management apparatus 300 to transmit a frame to the onboard apparatus 201. In other words, 0 is the number of the reception channel for the frame which has a CAN ID of 100 as the transmission source, and 2 and 3 are the numbers of the transmission channels for the frame which has a CAN ID of 100 as the destination. In a similar manner, 0 is the number of the reception channel for the frame which has a CAN ID of 110 as the transmission source, and 1 and 2 are the numbers of the transmission channels for the frame which has a CAN ID of 110 as the destination. 1 is the number of the reception channel for the frame which has a CAN ID of 200 and 250 as the transmission source, and 2 is the number of the transmission channel for the frame which has a CAN ID of 200 and 250 as the destination. 2 is the number of the reception channel for the frame which has a CAN ID of 300 as the transmission source, and 4 is the number of the transmission channel for the frame which has a CAN ID of 300 as the destination.

The relay table 306 is used to relay communications between the onboard apparatuses 201 and other apparatuses (for example, another onboard apparatus 201 or an apparatus external to the vehicle 10). Now, we will look at an example in which a CAN frame with a CAN ID of 100 is transmitted from one onboard apparatus 201 to another onboard apparatus 201. In this CAN frame, the CAN ID of 100 is included in the destination. The management apparatus 300 receives the CAN frame by channel 1 and extracts the destination CAN ID of 100 from the CAN frame. The management apparatus 300 references the relay table 306, identifies that the numbers of the CAN ID 100 transmission channels are 2 and 3, and transmits the CAN frame to the selected channels.

The channel management table 307 is used in the connection status determination processing described above. The channel management table 307 is a correspondence table indicating the correspondence relationship between the apparatus ID of the onboard apparatuses 201 and the channels which the onboard apparatuses 201 should connect to. Here, apparatus ID is a unique identification information allocated to each onboard apparatus 201 and is a serial number, a MAC address, or the like of the onboard apparatus 201, for example. The channel management table 307 will be described below.

The communication interface 304 is connected to a communication line connected to the channels 400_1, 400_2, and 400_3 of the onboard network 400, the outside-vehicle communication unit 202, and the central apparatus 203.

4. CONFIGURATION OF ONBOARD APPARATUS

Figure 5:
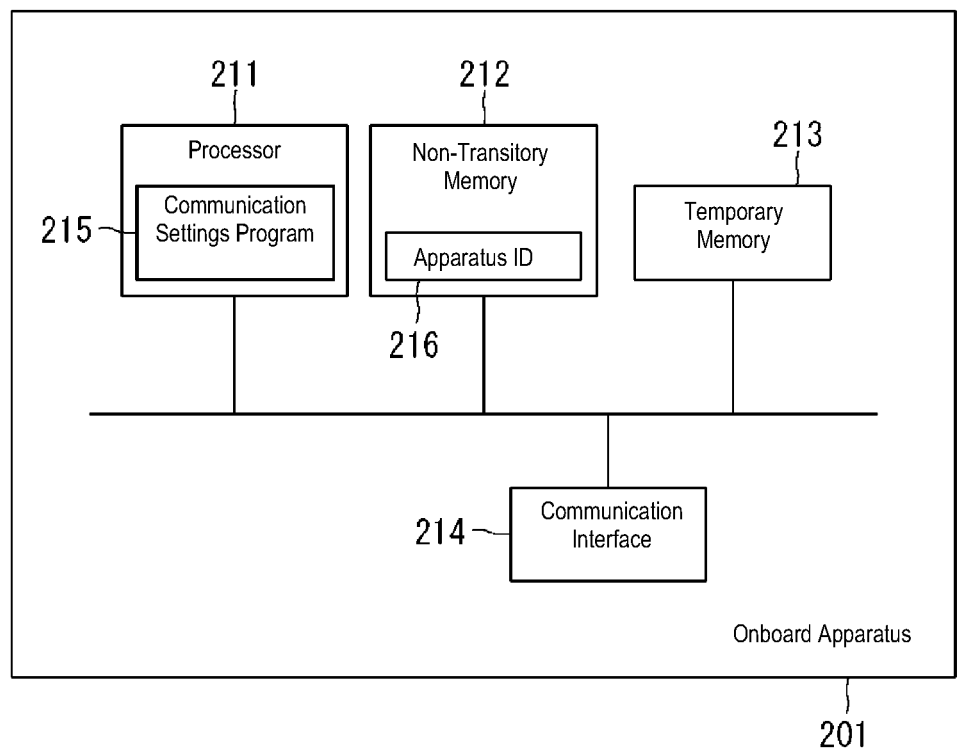
FIG. 5 is a block diagram illustrating an example of the configuration of an onboard apparatus according to an embodiment.

FIG. 5 is a block diagram illustrating an example of the configuration of an onboard apparatus according to the present embodiment. In this specific example, the onboard apparatus 201 is provided with a processor 211, a non-transitory memory 212, a temporary memory 213, and a communication interface 214.

The non-transitory memory 212 stores a communication settings program 215, which is a computer program, and data used to execute the communication settings program 215. The onboard apparatus 201 is provided with a computer, and the functions relating to setting the CAN ID of the onboard apparatus 201 are implemented by the processor 211, which is the CPU, executing the communication settings program 215, which is a computer program, stored in the storage apparatus of the computer. The communication settings program 215 is able to be stored in a recording medium, such as a flash memory, a ROM, a CD-ROM, and the like. The processor 211 executes the communication settings program 215 and executes the communication settings processing described below. Also, the non-transitory memory 212 stores an apparatus ID 216 of the apparatus.

Note that the processor 211 is not limited to being a CPU. The processor 211 may be a hardware logic circuit, such as an ASIC, a gate array, an FPGA, and the like, for example. In such cases, the hardware logic circuit is configured to execute processing similar to that of the communication settings program 215.

The communication interface 214 is connected to one or more of the channels 400_1, 400_2, and 400_3 of the onboard network 400.

5. CONFIGURATION OF SERVER

Figure 6:
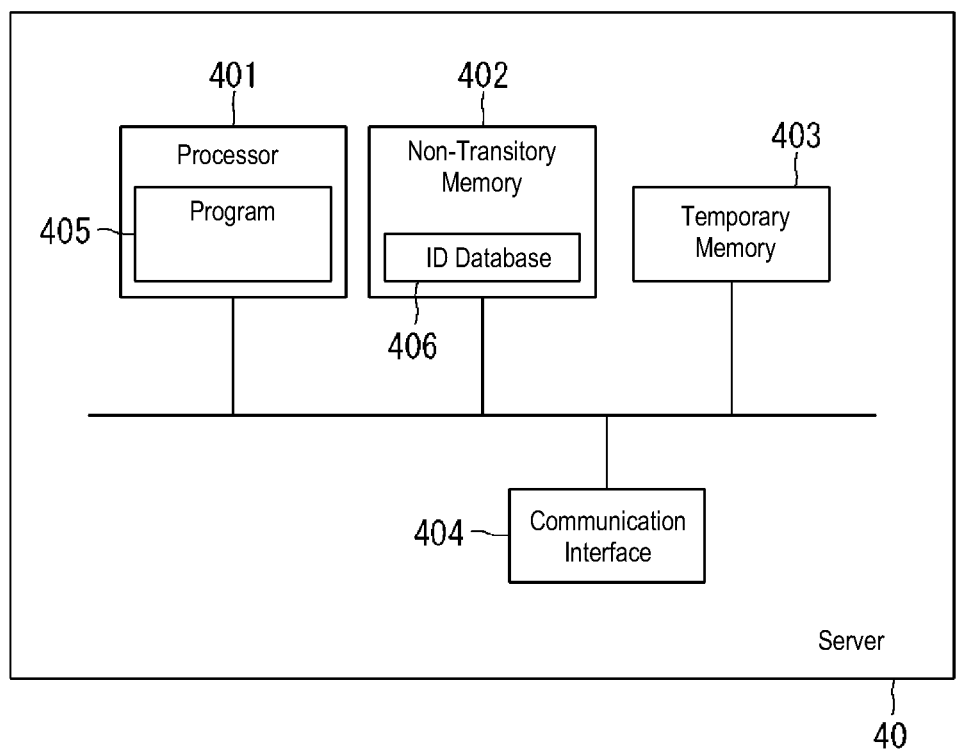
FIG. 6 is a block diagram illustrating an example of the configuration of a server according to an embodiment.

FIG. 6 is a block diagram illustrating an example of the configuration of a server according to the present embodiment. In this specific example, the server 40 is provided with a processor 401, a non-transitory memory 402, a temporary memory 403, and a communication interface 404.

The non-transitory memory 402 stores an ID allocation program 405, which is a computer program, and data used to execute the ID allocation program 405. The server 40 is provided with a computer, and the functions relating to CAN ID allocation for the onboard apparatuses 201 are implemented by the processor 401, which is the CPU, executing the ID allocation program 405, which is a computer program, stored in the storage apparatus of the computer. The ID allocation program 405 is able to be stored in a recording medium, such as a flash memory, a ROM, a CD-ROM, and the like. The processor 401 executes the ID allocation program 405 and executes the ID allocation processing described below.

The non-transitory memory 402 includes an ID database (hereinafter, referred to as IDDB) 406. The IDDB 406 is used in the ID allocation processing.

The IDDB 406 is a database for managing the CAN IDs allocated to the onboard apparatuses 201 for each vehicle 10. The IDDB 406 will be described below.

6. FUNCTION OF ONBOARD APPARATUS

Figure 7:
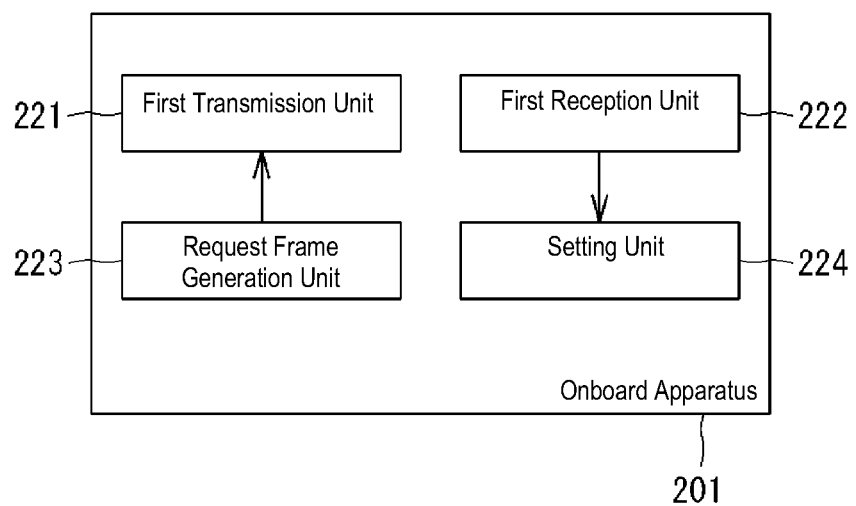
FIG. 7 is a functional block diagram illustrating an example of the functions of an onboard apparatus according to an embodiment.

Next, the function relating to setting the CAN ID of the onboard apparatus 201 will be described. FIG. 7 is a functional block diagram illustrating an example of the functions of an onboard apparatus according to the present embodiment. The onboard apparatuses 201 includes functions including a first transmission unit 221, a first reception unit 222, a request frame generation unit 223, and a setting unit 224.

The request frame generation unit 223 generates a request frame for CAN ID assignment. For example, in a case where a new onboard apparatus 201 is connected to the onboard network 400, when the onboard system 200 activates, the onboard apparatus 201 sends a request to the management apparatus 300 to be assigned with a CAN ID. At this time, a request frame is generated, and the request frame is transmitted to the management apparatus 300. The request frame generation unit 223 is implemented mainly by the processor 211.

Figure 8:
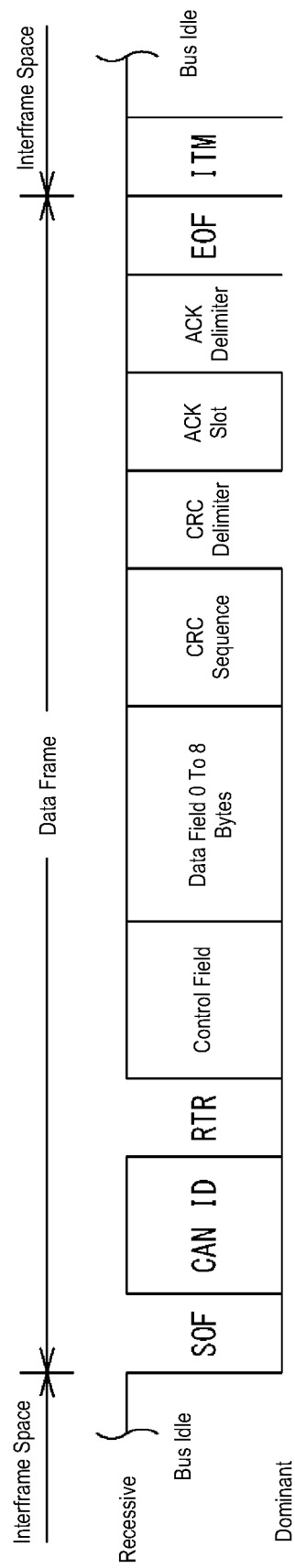
FIG. 8 is a schematic diagram illustrating a CAN frame format.

FIG. 8 is a schematic diagram illustrating a CAN frame format. The data frame structure of a CAN standard format is illustrated in FIG. 8. The line on the upper side in the diagram represents recessive, and the line on the lower side represents dominant. As illustrated in FIG. 8, the CAN data frame includes fields including a Start Of Frame (SOF), a CAN ID, a Remote Transmission Request (RTR), a control field, a data field, a Cyclic Redundancy Check (CRC) sequence, a CRC delimiter, an Acknowledgement (ACK) slot, an ACK delimiter, and End Of Frame (EOF). The SOF indicates the start of the frame. The CAN ID is used to identify the type of the onboard apparatus 201 and the frame. The RTR is used to identify the data frame and the remote frame. In the case of a data frame, the RTR is dominant. The control field stores information used in communication control. The data field stores actual data (payload) of a maximum of 8 bytes. The CRC sequence and the CRC delimiter are collectively referred to as a CRC field, and the CRC field stores a type of error detection code. The ACK slot and the ACK delimiter are collectively referred to as an ACK field, and the ACK field stores information indicating whether or not up to the CRC field portion has been normally received. The EOF indicates the end of the frame.

Figure 9:
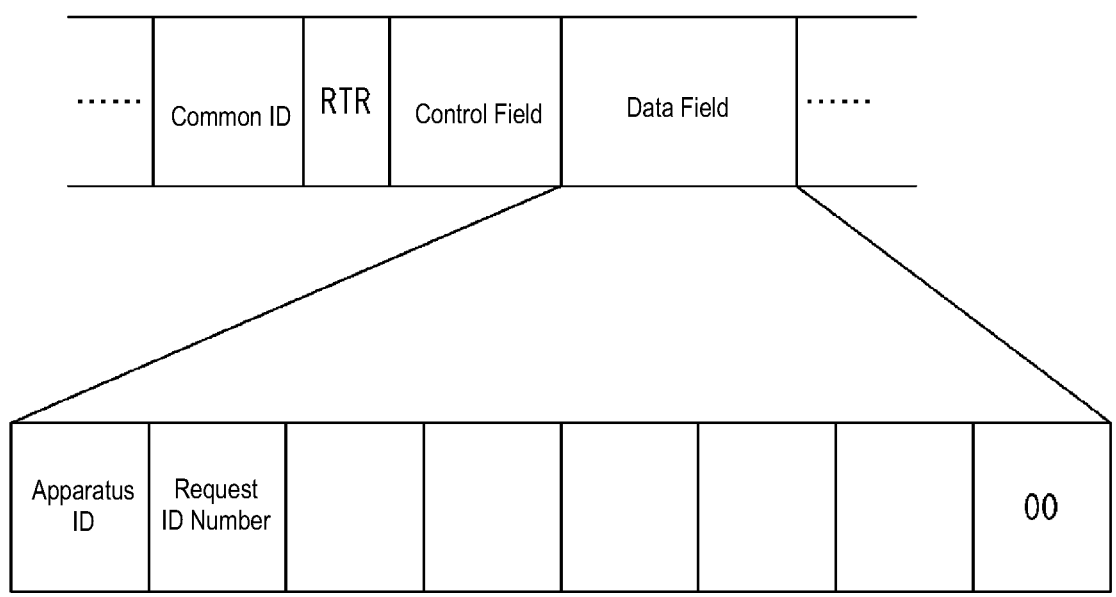
FIG. 9 is a schematic diagram illustrating an example of a request frame according to an embodiment.

FIG. 9 is a schematic diagram illustrating an example of a request frame according to the present embodiment. A CAN ID field of a frame relating to CAN ID allocation stores a common ID (for example, 0×6FF). The common ID is used to identify that a frame is a frame (request frame or response frame) relating to CAN ID allocation. The common ID is common information in the onboard network 400. In other words, all of the onboard apparatuses 201 and the management apparatus 300 connected to the onboard network 400 use a single common ID when sending and receiving a frame relating to CAN ID allocation. The apparatus that receives a request frame identifies that the frame is a frame relating to CAN ID allocation by referencing the common ID of the CAN ID field.

The data field of the request frame includes data including apparatus ID and request ID number. The number of CAN IDs allocated to one onboard apparatus 201 is not limited to one and may be a plurality. The request ID number is the number of CAN IDs requested by the onboard apparatus 201. The end of the data field of the request frame includes an identifier indicating that the frame is a request frame, in other words, an identifier dedicated to CAN ID requesting (00 in the example of FIG. 9). The apparatus that receives a request frame identifies that the frame is a request frame by referencing the identifier. Note that in the example described above, a request frame for CAN is used. However, a request frame can be used in CAN FD. In this case, the common ID is stored in the CAN ID field in an CAN FD frame format, and the apparatus ID and the request ID number are stored in the data field.

Now we will return to FIG. 7. The first transmission unit 221 transmits the request frame generated by the request frame generation unit 223 via a CAN bus (channel) connected to the onboard apparatus 201. The first transmission unit 221 is implemented by mainly the communication interface 214.

The management apparatus 300 transmits a response frame corresponding to the request frame. The first reception unit 222 receives the response frame via a CAN bus (channel) connected to the onboard apparatus 201. The first reception unit 222 is implemented by mainly the communication interface 214.

In a case where the response frame received by the first reception unit 222 is a normal response frame, the setting unit 224 sets the CAN ID included in the normal response frame as the CAN ID of the apparatus. The CAN ID of the apparatus is stored in the non-transitory memory 212, for example. The CAN ID is used as information to identify the onboard apparatus 201 in the following communications using the onboard network 400. The setting unit 224 is implemented mainly by the processor 211.

7. FUNCTION OF MANAGEMENT APPARATUS

Figure 10:
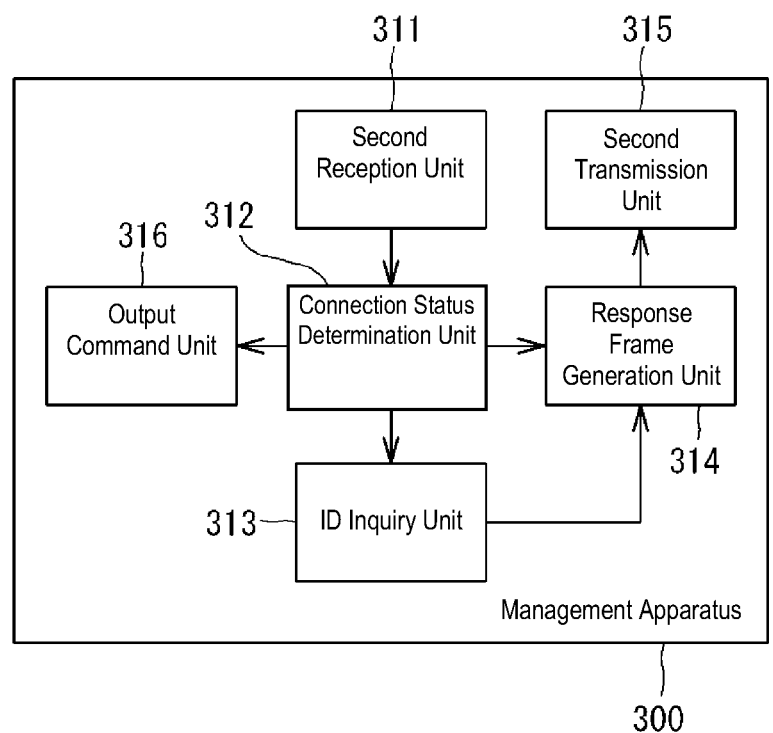
FIG. 10 is a functional block diagram illustrating an example of the functions of a management apparatus according to an embodiment.

Next, the function of the management apparatus 300 relating to assigning a CAN ID to the onboard apparatus 201 will be described. FIG. 10 is a functional block diagram illustrating an example of the functions of a management apparatus according to the present embodiment. The management apparatus 300 includes function including a second reception unit 311, a connection status determination unit 312, an ID inquiry unit 313, a response frame generation unit 314, a second transmission unit 315, and an output command unit 316.

The second reception unit 311 receives the request frame transmitted from the onboard apparatus 201 via a CAN bus (channel). The second reception unit 311 is implemented by mainly the communication interface 304.

The connection status determination unit 312 determines whether or not the correspondence relationship between the unique ID included in the request frame received by the second reception unit 311 and the channel that transmitted the request frame matches the correspondence relationship indicated in the channel management table 307.

FIG. 11 is a diagram illustrating an example of the configuration of a channel management table. The channel management table 307 is a table in which the numbers of the channels of the onboard network 400 and the apparatus ID range are associated together and stored. In FIG. 11, the apparatus ID are represented as hexadecimal numbers. In the example illustrated in FIG. 11, the apparatus ID range from 0×00 to 0×2F corresponds to the channel 0. In other words, the connection destination of onboard apparatuses 201 with an apparatus ID from 0×00 to 0×2F is channel 0. In a similar manner, the apparatus ID range from 0×30 to 0×5F corresponds to the channel 1. The apparatus ID range from 0x60 to 0×8F corresponds to the channel 2. The apparatus ID range from 0×90 to 0×BF corresponds to the channel 3. The apparatus ID range from 0×CO to 0×EF corresponds to the channel 4.

Now we will return to FIG. 10. The connection status determination unit 312 references the channel management table 307 for the apparatus ID included in the request frame and the number of the channel that transmitted the request frame. In other words, the connection status determination unit 312 uses the channel management table 307 to identify the apparatus ID range corresponding to the number of the channel that transmitted the request frame and determines whether or not the apparatus ID included in the request frame is included in the identified apparatus ID range. In a case where the apparatus ID included in the request frame is within the identified apparatus ID range, the connection status determination unit 312 determines that the onboard apparatus 201 which is the transmission source of the request frame is connected to the appropriate channel. On the other hand, in a case where the apparatus ID included in the request frame is outside the identified apparatus ID range, the connection status determination unit 312 determines that the onboard apparatus 201 which is the transmission source of the request frame is connected to an inappropriate channel. The connection status determination unit 312 is implemented mainly by the processor 301.

In a case where the apparatus ID included in the request frame is within the identified apparatus ID range, the ID inquiry unit 313 sends a request to the server 40 for CAN ID allocation. Specifically, the ID inquiry unit 313 requests for allocation of the number of CAN IDs corresponding to the request ID number included in the request frame. The request includes the apparatus ID of the onboard apparatus 201 which is the transmission source of the request frame and the request ID number. When a CAN ID allocation request is received, the server 40 allocates the number of CAN IDs corresponding to the request ID number.

The ID allocation processing by the server 40 will now be described. FIG. 12 is a diagram illustrating an example of the configuration of the IDDB 406. CAN IDs and apparatus IDs are associated together and stored in the IDDB 406. Also, the number of the channels used for each CAN ID is stored in the IDDB 406. In the example illustrated in FIG. 12, r represents a channel (reception channel) used by the management apparatus 300 to receive a frame, and s represents a channel (transmission channel) used by the management apparatus 300 to transmit a frame to the onboard apparatus 201. In other words, the IDDB 406 illustrated in FIG. 12 indicates which from which channel (reception channel) to which channel (transmission channel) a frame is relayed when, in a case where a CAN ID is allocated to the onboard apparatus 201, the management apparatus 300 communicates using that CAN ID. In a case where a CAN ID is allocated to the apparatus ID, in the IDDB 406, the CAN ID, the apparatus ID, and the number of the transmission channel and the reception channel are associated together and stored. In the example of FIG. 12, the apparatus ID 0×10, the transmission channel 0, and the reception channels 2 and 3 are registered under the CAN ID 100. The apparatus ID 0×40, the transmission channel 1, and the reception channel 2 are registered under the CAN ID 200. The apparatus ID 0×50, the transmission channel 1, and the reception channel 2 are registered under the CAN ID 250. The apparatus ID 0×70, the transmission channel 2, and the reception channel 4 are registered under the CAN ID 300.

The apparatus IDs not allocated with a CAN ID are not registered in the IDDB 406. In a case where there is no apparatus ID corresponding to a CAN ID, the apparatus ID corresponding to the CAN ID is left blank. In the example of FIG. 12, because there is no apparatus ID corresponding to CAN ID 210, the apparatus ID corresponding to CAN ID 210 is left blank.

Regarding the channel number, in some cases, a transmission channel number and a reception channel number are not registered under a CAN ID not allocated to an apparatus ID (in other words, an unused CAN ID) and, in some cases, a transmission channel number and a reception channel number are registered. In a case where a new onboard apparatus 201 is connected to the onboard network 400, the channel used by the management apparatus 300 is determined using one of the two following cases.

1. The channel is dynamically determined taking into account the channel usage situation in the onboard network 400 (hereinafter, referred to as dynamic channel determination).
2. The channel is determined in advance for the CAN ID so that CAN bus load bias is reduced or the like (hereinafter, referred to as static channel determination).

In a specific example, whether to use dynamic channel determination or static channel determination is determined for each CAN ID. However, no such limitation is intended, and either dynamic channel determination or static channel determination may be used for all CAN IDs.

In a case where dynamic channel determination is used, in the IDDB 406, the transmission channels and the reception channels are not registered under the CAN ID with a blank apparatus ID (in other words, a record with a blank apparatus ID). In the example of FIG. 12, the transmission channels and the reception channels corresponding to CAN ID 210 are not registered. In dynamic channel determination, a new onboard apparatus 201 (i.e., one not allocated with a CAN ID) transmits a request frame to the management apparatus 300, and the management apparatus 300, having received the request frame, determines the channel to use for communication associated with the onboard apparatus 201 (communication with the onboard apparatus 201 as the destination or transmission source) on the basis of the usage situation of the channel (the number of connections of the onboard apparatus 201 for each channel and the like) in the onboard network 400. The management apparatus 300 notifies the server 40 of the apparatus ID of the onboard apparatus 201 together with the determined channel number. The server 40 allocates a CAN ID to the onboard apparatus 201 and, in the IDDB 406, associates the apparatus ID, the reception channels, and the transmission channels with the CAN ID and registers them.

In a case where static channel determination is used, in the IDDB 406, the transmission channels and the reception channels are registered in advance under the CAN ID with a blank apparatus ID. In the example of FIG. 12, the transmission channel number 1 and the reception channel number 3 are determined in advance for the CAN ID 350, and, in the CAN ID 350 record, the value of the channel 1 is r and the value of the channel 3 is s. In static channel determination, the management apparatus 300, having received a request frame from a new onboard apparatus 201, sends a request to the server 40 requesting a CAN ID for the onboard apparatus 201 and requesting channel allocation. The server 40 allocates a CAN ID to the onboard apparatus 201 and, in the IDDB 406, associates the apparatus ID with the allocated CAN ID and registers them. Also, the server 40 references the IDDB 406, identifies the reception channel number and the transmission channel number predetermined for the allocated CAN ID, and transmits the identified reception channel number and the transmission channel number to the management apparatus 300.

Now we will return to FIG. 10. The ID inquiry unit 313 receives a notification of the CAN ID transmitted from the server 40. The ID inquiry unit 313 is implemented by mainly the communication interface 304.

The response frame generation unit 314 generates a response frame (normal response frame or abnormal response frame) including the CAN ID allocated to the request frame received by the second reception unit 311, i.e., the CAN ID received from the server 40. Specifically, in a case where the apparatus ID included in the request frame is within the identified apparatus ID range, the response frame generation unit 314 generates a normal response frame including the CAN ID allocated by the server 40, and, in a case where the apparatus ID included in the request frame is outside the identified apparatus ID range, the response frame generation unit 314 generates an abnormal response frame not including a CAN ID. The response frame generation unit 314 is implemented mainly by the processor 301.

Figure 13:
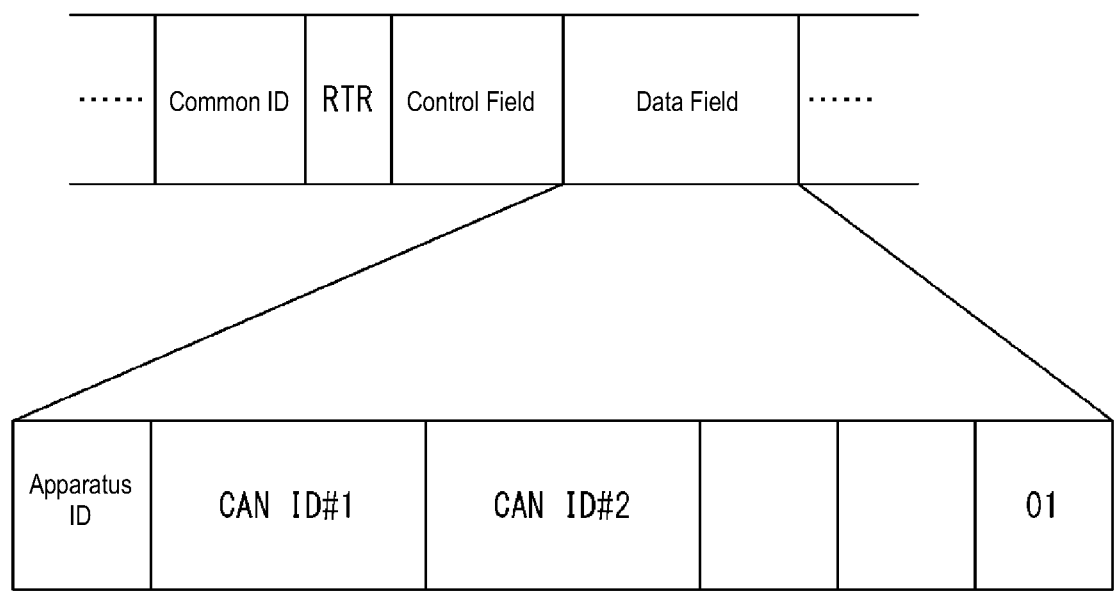
FIG. 13 is a schematic diagram illustrating an example of a normal response frame according to an embodiment.

FIG. 13 is a schematic diagram illustrating an example of a normal response frame according to the present embodiment. A CAN ID field of a normal response frame stores a common ID. The data field of the normal response frame includes data including apparatus ID and allocated CAN ID. Specifically, the allocated number of CAN IDs are stored in the data field. The end of the data field of the normal response frame includes an identifier indicating that the frame is a normal response frame, in other words, an identifier dedicated to allocated CAN ID notification (01 in the example of FIG. 13). The apparatus that receives a normal response frame identifies that the frame is a normal response frame by referencing the identifier.

Figure 14:
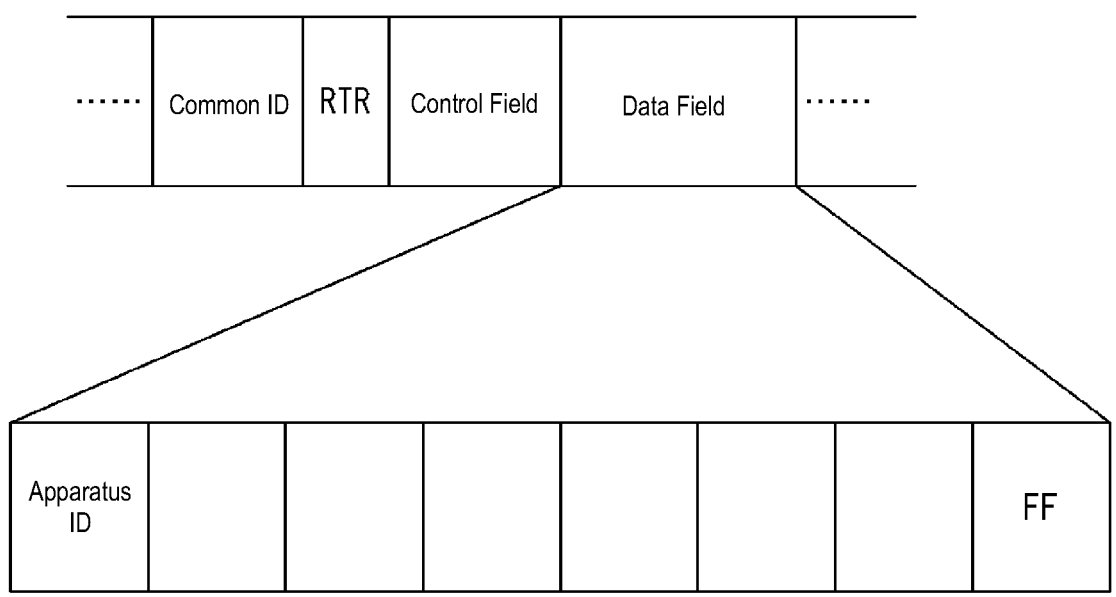
FIG. 14 is a schematic diagram illustrating an example of an abnormal response frame according to an embodiment.

FIG. 14 is a schematic diagram illustrating an example of an abnormal response frame according to the present embodiment. A CAN ID field of an abnormal response frame stores a common ID. The data field of the abnormal response frame includes data including apparatus ID. In other words, the data field of the abnormal response frame does not include CAN ID. The end of the data field of the abnormal response frame includes an identifier indicating that the frame is an abnormal response frame, in other words, an identifier dedicated to notifying that CAN ID allocation has not been performed (FF in the example of FIG. 14). The apparatus that receives an abnormal response frame identifies that the frame is an abnormal response frame by referencing the identifier.

Now we will return to FIG. 10. The second transmission unit 315 transmits the response frame (normal response frame or abnormal response frame) generated by the response frame generation unit 314 via a CAN bus (channel) connected to the onboard apparatus 201 which is the CAN ID request source. The second transmission unit 315 is implemented by mainly the communication interface 304.

In a case where the apparatus ID included in the request frame is outside the identified apparatus ID range, the output command unit 316 transmits an error output command to the central apparatus 203. The central apparatus 203 (see FIG. 2) executes an error output when the error output command is received. An error output is, for example, a display of error information, an audio output of error information, an output of a buzzer sound, or the like. The output command unit 316 is implemented by mainly the communication interface 304.

8. OPERATIONS OF ONBOARD SYSTEM

Figure 15:
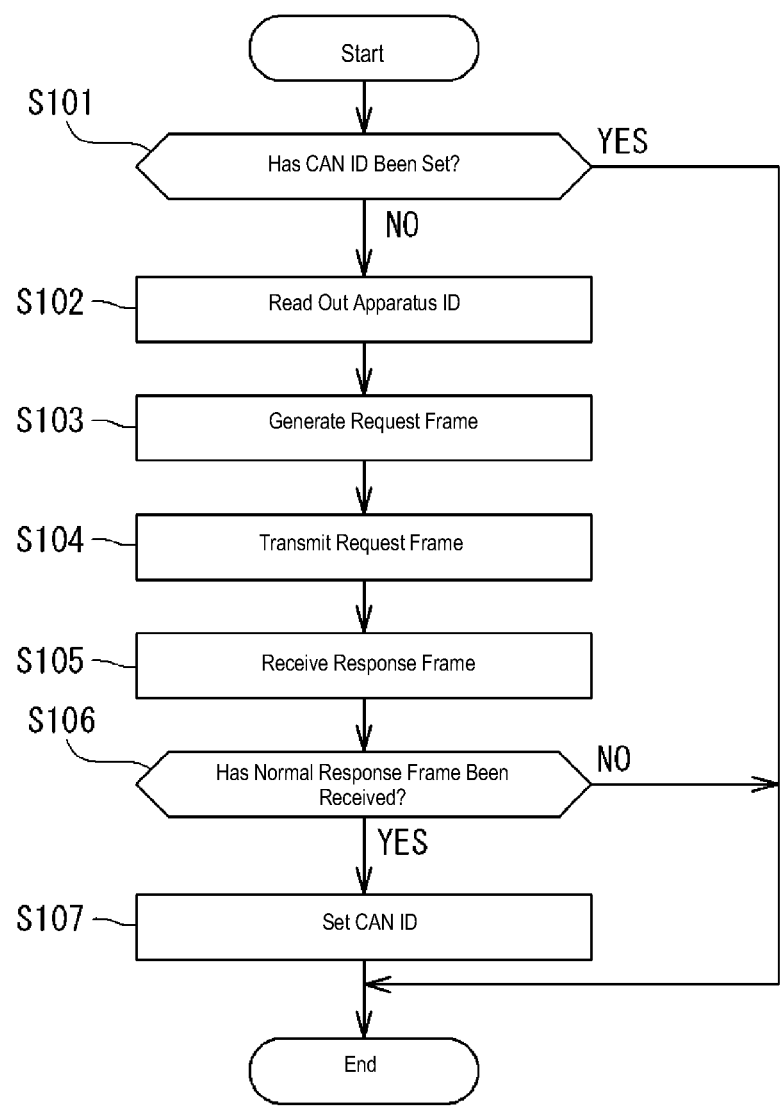
FIG. 15 is a flowchart illustrating an example of the process of communication settings processing by an onboard apparatus according to an embodiment.
Figure 16:
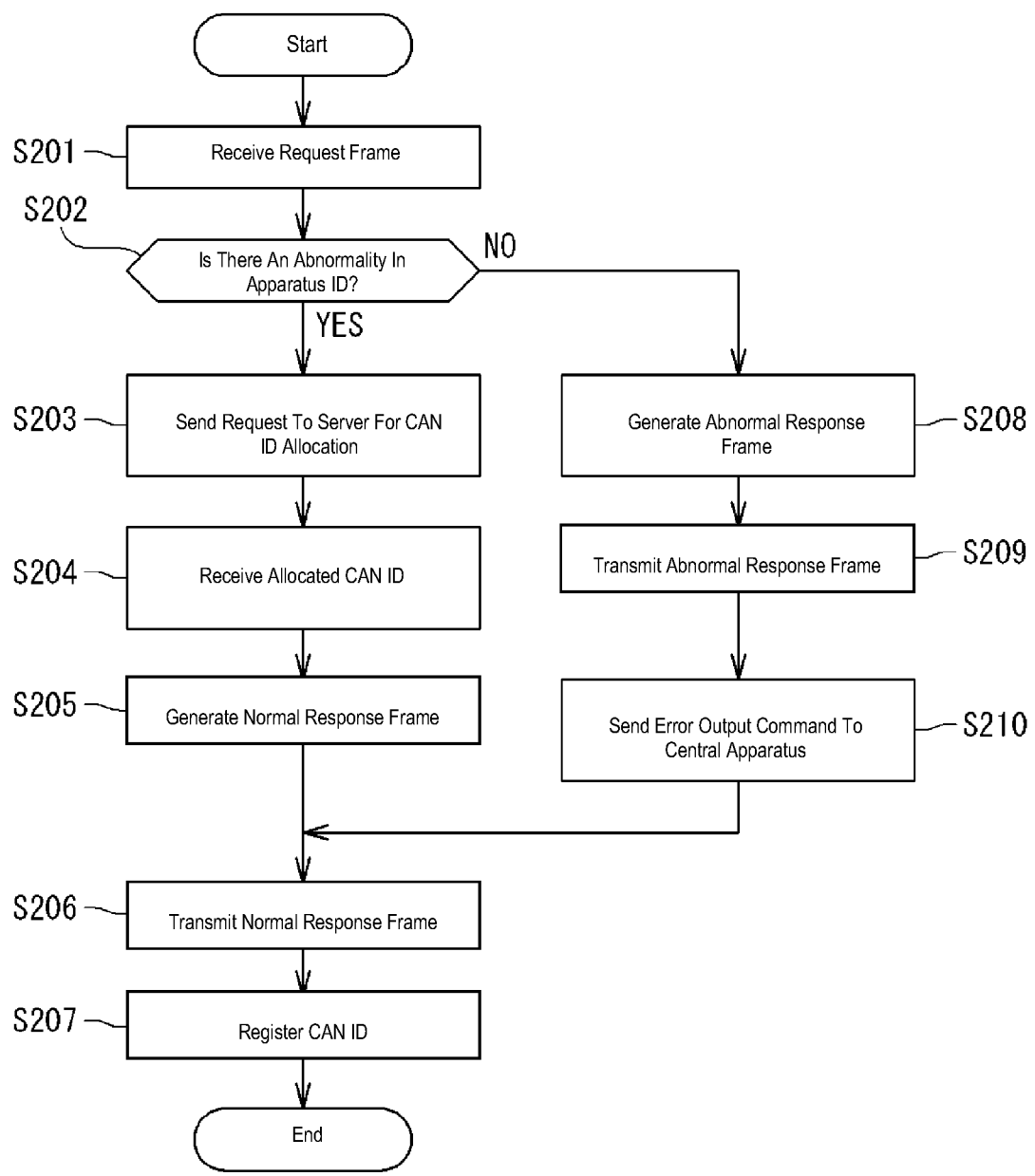
FIG. 16 is a flowchart illustrating an example of the process of communication management processing by an onboard apparatus according to an embodiment.

The operations of an onboard system according to the present embodiment will now be described. FIG. 15 is a flowchart illustrating an example of the process of the communication settings processing of the onboard apparatus 201 according to the present embodiment. FIG. 16 is a flowchart illustrating an example of the process of the communication management processing of the management apparatus 300 according to the present embodiment.

Now, FIG. 15 will be referenced. The processor 211 of the onboard apparatus 201 activates the communication settings program 215 (see FIG. 5) when the onboard apparatus 201 activates or when a connection of the onboard apparatus 201 to the onboard network 400 is detected, for example. In this manner, the processor 211 starts the communication settings processing. In the communication settings processing, firstly, the processor 211 determines whether or not the apparatus has been set up with a CAN ID (step S101). In this processing, for example, whether or not a CAN ID has been set up is determined by determining whether or not a CAN ID has been stored in the non-transitory memory 212.

In a case where a CAN ID has been set up (yes in step S101), the processor 211 ends the communication settings processing. On the other hand, in a case where a CAN ID has not been set up (no in step S101), the processor 211 reads out the apparatus ID 216 from the non-transitory memory 212 (step S102). Also, the processor 211 generates a request frame including the read apparatus ID 216 (step S103). Next, the processor 211 causes the communication interface 214 to transmit the generated request frame via the channel which the onboard apparatus 201 is connected to (step S104).

Now, FIG. 16 will be referenced. The processor 301 of the management apparatus 300 activates the communication management program 305 (see FIG. 3) when the onboard apparatus 201 is activated, for example. In this manner, the processor 301 starts the communication management processing. In the communication management processing, the management apparatus 300 receives the request frame transmitted from the onboard apparatus 201 (step S201).

Next, the processor 301 executes the connection status determination processing (step S202). In other words, the processor 301 determines whether or not the correspondence relationship between the apparatus ID of the onboard apparatus 201 which is the transmission source of the request frame and the channel which the onboard apparatus 201 is connected to matches the correspondence relationship between the apparatus ID and the channel registered in the channel management table 307. In the processing, in a case where the correspondence relationship between the apparatus ID of the onboard apparatus 201 which is the transmission source of the request frame and the channel which the onboard apparatus 201 is connected to matches the correspondence relationship between the apparatus ID and the channel registered in the channel management table 307, it is determined that there is no abnormality in the apparatus ID. In a case where this does not match the correspondence relationship between the apparatus ID and the channel registered in the channel management table 307, it is determined that there is an abnormality in the apparatus ID.

In a case where the result of the connection status determination processing is that there is no abnormality in the apparatus ID (yes in step S202), the processor 301 transmits the CAN ID request to the server 40 (step S203). The server 40 allocates a CAN ID to the apparatus ID in response to the request and notifies the management apparatus 300 of the allocated CAN ID. The management apparatus 300 receives the allocated CAN ID notification from the server 40 (step S204).

Here, in a case where the dynamic channel determination described above is used, the management apparatus 300 determines what channel to use in communication relating to a new onboard apparatus 201 on the basis of the channel usage situation in the onboard network 400. The management apparatus 300, in requesting a CAN ID from the server 40, notifies the server 40 of the determined channel number. The server 40 allocates the onboard apparatus 201 with a CAN ID and associates together the apparatus ID, the reception channel number, and the transmission channel number with the CAN ID and registers them in the IDDB 406.

In a case where static channel determination is used, the management apparatus 300 sends a request to the server 40 requesting a CAN ID for the new onboard apparatus 201 and requesting channel allocation. The server 40 allocates a CAN ID to the onboard apparatus 201 and, in the IDDB 406, associates the apparatus ID with the allocated CAN ID and registers them. Also, the server 40 references the IDDB 406 and transmits the reception channel number and the transmission channel number predetermined for the allocated CAN ID to the management apparatus 300.

The processor 301 generates a normal response frame including the received CAN ID (step S205). The processor 301 causes the communication interface 214 to transmit the generated normal response frame via the channel which the onboard apparatus 201 which is the transmission target is connected to (step S206). Also, the processor 301 registers the CAN ID allocated to the onboard apparatus 201 in the relay table 306 (step S207).

In a case where dynamic channel determination is used, when a CAN ID is registered in the relay table 306, the processor 301 associates the determined transmission channel number and the reception channel number with the CAN ID and registers them. In a case where static channel determination is used, when a CAN ID is registered in the relay table 306, the processor 301 associates the transmission channel number and the reception channel number received from the server 40 with the CAN ID and registers them. This ends the communication management processing.

On the other hand, in a case where the result of the connection status determination processing is that there is an abnormality in the apparatus ID (no in step S202), the processor 301 generates an abnormal response frame (step S208). The processor 301 causes the communication interface 214 to transmit the generated abnormal response frame via the channel which the onboard apparatus 201 which is the transmission target is connected to (step S209). Also, the processor 301 causes the communication interface 214 to transmit an error output command to the central apparatus 203 (step S210). This ends the communication management processing.

Now we will return to FIG. 15. The onboard apparatus 201 which is the transmission source of the request frame receives the response frame (normal response frame or abnormal response frame) transmitted from the management apparatus 300 (step S105). The processor 211 determines whether the received response frame is a normal response frame or an abnormal response frame (step S106). In other words, the processor 211 determines whether there is an abnormality in the apparatus ID or whether there is not an abnormality in the apparatus ID. In a case where the received frame is an abnormal response frame (no in step S106), the processor 211 cancels the communication settings processing.

On the other hand, in a case where the received frame is a normal response frame (yes in step S106), the processor 211 sets the CAN ID included in the received normal response frame as the CAN ID of the apparatus (step S107). This ends the communication settings processing.

9. MODIFIED EXAMPLE

Figure 17:
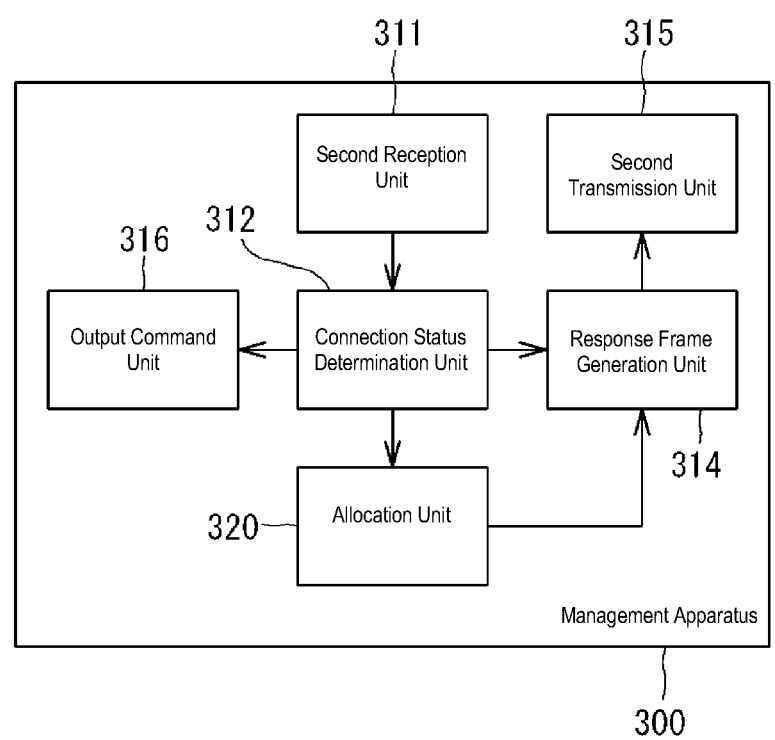
FIG. 17 is a functional block diagram illustrating a modified example of the functions of a management apparatus according to an embodiment.

Note that the configuration of the management apparatus 300 is not limited to the configuration of the management apparatus 300 according to the embodiment described above. For example, the management apparatus 300 may include the function of the server 40. In other words, the management apparatus 300 may allocate a CAN ID to the onboard apparatus 201 that transmitted a request frame. In this case, the server 40 may be omitted. FIG. 17 is a functional block diagram illustrating a modified example of the functions of a management apparatus according to this embodiment. The management apparatus 300 illustrated in FIG. 17 includes the function of an allocation unit 320 instead of the ID inquiry unit 313. The allocation unit 320 allocates a CAN ID to the request frame received by the second reception unit 311. In a specific example, the allocation unit 320 executes ID allocation processing in a similar manner to the server 20 described above.

In the configuration described above, in a case where the correspondence relationship between the apparatus ID of the onboard apparatus 201 which is the transmission source of the request frame and the channel that transmitted the request frame and the correspondence relationship defined in the channel management table 307 does not match, the management apparatus 300 transmits an error output command to the central apparatus 203. However, no such limitation is intended. In a case where the correspondence relationship between the apparatus ID of the onboard apparatus 201 which is the transmission source of the request frame and the channel that transmitted the request frame and the correspondence relationship defined in the channel management table 307 does not match, the management apparatus 300 may perform error output by displaying error information, outputting audio of error information, outputting a buzzer sound, or the like.

In the embodiment described above, the common ID is stored in the CAN ID field in both the request frame and the response frame. However, no such limitation is intended.

The information stored in the CAN ID field may be different in the request frame and the response frame. For example, a first common ID may be stored in the CAN ID field of the request frame, and a second common ID (providing that the first common ID and the second common ID are different) may be stored in the CAN ID field of the response frame. Here, the first common ID and the second common ID may be common information in the onboard network 400. In other words, all of the onboard apparatuses 201 and the management apparatus 300 connected to the onboard network 400 may use the first common ID to send and receive request frames and may use the second common ID to send and receive response frames. The apparatus that receives a request frame identifies that the frame is a request frame by referencing the first common ID of the CAN ID field, and the apparatus that receives a response frame identifies that the frame is a response frame by referencing the second common ID of the CAN ID field.

In the configuration described above, a CAN ID is allocated to a request frame. However, no such limitation is intended. Instead of a CAN ID, an extended ID defined in a CAN frame extended format may be used. In this case, the apparatus ID is not stored in the data field of the request frame, and the extended ID is statically set and the onboard apparatus and the request frame are identified. For example, the apparatus ID is set to the extended ID or a different ID for each onboard apparatus indicating that it is a request frame is set to the CAN ID and the extended ID. In this manner, without referencing the data field, which onboard apparatus the request frame is from can be identified from the CAN ID and the extended ID.

10. EFFECTS

As described above, the onboard system 200 is provided with the management apparatus 300 connected to the onboard network 400 and the onboard apparatuses 201 connect to the onboard network 400. The onboard apparatus 201 includes the first transmission unit 221, the first reception unit 222, and the setting unit 224. The management apparatus 300 includes the second reception unit 311, the response frame generation unit 314, and the second transmission unit 315. The first transmission unit 221 transmits a request frame with a CAN ID assigned including the apparatus ID (unique ID) of the onboard apparatus 201. The second reception unit 311 receives the request frame transmitted from the onboard apparatus 201. The response frame generation unit 314 generates a response frame including the CAN ID allocated to the request frame received by the second reception unit 311. The second transmission unit 315 transmits the response frame generated by the response frame generation unit 314 to the onboard apparatus 201 which is the transmission source of the request frame. The first reception unit 222 receives the response frame transmitted from the management apparatus 300. The setting unit 224 sets the CAN ID included in the response frame received by the first reception unit 222 as the CAN ID of the apparatus. In this manner, in response to the request frame transmitted from the onboard apparatus 201, the server 40, which is an apparatus different to the onboard apparatus 201, can allocate CAN IDs to onboard apparatuses 201 so that they are not the same. In other words, because the server 40 can identify the CAN ID allocated to each onboard apparatus 201, the server 40 can make sure that the CAN ID allocated to one onboard apparatus 201 is not allocated to another onboard apparatus 201. Accordingly, in a case where a plurality of onboard apparatuses 201 simultaneously request for allocation of a CAN ID or in a case where one onboard apparatus 201 requests for allocation of a plurality of CAN IDs, an increase in the time needed to allocate the CAN IDs can be suppressed.

The request frame may further include the number (the number of request IDs) of requested CAN IDs. The response frame may include the number of different CAN IDs corresponding to the request ID number. In this manner, a plurality of CAN IDs can be assigned to one onboard apparatus 201.

The response frame may include a normal response frame and an abnormal response frame. In a case where a CAN ID is allocated, the response frame generation unit 314 may generate a normal response frame including the allocated CAN ID. In a case where a CAN ID is not allocated, the response frame generation unit 314 may generate an abnormal response frame not including a CAN ID. The second transmission unit 315 may transmit the normal response frame or the abnormal response frame generated by the response frame generation unit 314 to the onboard apparatus 201 which is the transmission source. In this manner, in a case where the onboard apparatus 201 receives a normal response frame, the onboard apparatus 201 can acquire a CAN ID included in a normal response frame. In a case where the onboard apparatus 201 receives an abnormal response frame, the onboard apparatus 201, without acquiring a CAN ID, can perform the necessary measures, such as re-transmitting a request frame.

The management apparatus 300 may further include the non-transitory memory 302 and the connection status determination unit 312. The non-transitory memory 302 stores the channel management table 307 indicating the correspondence relationship between the apparatus ID of the onboard apparatuses 201 and the channels of the CAN bus which the onboard apparatuses 201 are connected to. The connection status determination unit 312 determines whether or not the correspondence relationship between the apparatus ID included in the request frame received by the second reception unit 311 and the channel that transmitted the request frame matches the correspondence relationship indicated in the channel management table 307. In a case where the correspondence relationship between the apparatus ID included in the request frame and the channel that transmitted the request frame and the correspondence relationship indicated in the channel management table 307 are determined to match by the connection status determination unit 312, the response frame generation unit 314 generates a normal response frame. In a case where the correspondence relationship between the apparatus ID included in the request frame and the channel that transmitted the request frame and the correspondence relationship indicated in the channel management table 307 are determined to not match by the connection status determination unit 312, the response frame generation unit 314 generates an abnormal response frame. In this manner, in a case where the onboard apparatus 201 is not connected to the correct channel, a connection abnormality notification can be sent by transmitting the abnormal response frame, without allocating a CAN ID to the onboard apparatus 201.

The request frame may include a common ID which is common identification information in the onboard network 400 and identification information dedicated to CAN ID allocation. The CAN frame includes a region for storing the CAN ID of the onboard apparatus 201, but does not include the CAN ID to be stored in the onboard apparatus 201 before CAN ID allocation. Thus, because the request frame stores a common ID, the CAN ID of the onboard apparatus 201 is not needed, and an onboard apparatus, such as the management apparatus 300, which received a request frame can recognize the frame as a frame to use in CAN ID allocation.

The request frame may further include an identifier dedicated to requesting CAN IDs. Accordingly, an onboard apparatus, such as the management apparatus 300, which received the request frame can identify request frames and response frames.

The response frame may include a common ID. Accordingly, the onboard apparatus 201 which received the response frame can recognize the frame as a frame to use in CAN ID allocation.

The response frame may further include an identifier dedicated to responding to requests for CAN IDs. Accordingly, the onboard apparatus 201 which received the response frame can identify request frames and response frames.

The management apparatus 300 may further include an allocation unit for allocating a CAN ID to a request frame received by the second reception unit 311. Accordingly, the management apparatus 300 can allocate a CAN ID to a request frame without querying an external apparatus such as a server.

The data structure used in the request frame includes a CAN ID region and a data region. The CAN ID region stores the common ID in the onboard network 400. The data region stores the apparatus ID of the onboard apparatus 201 which requests for CAN ID allocation and the number of requests for CAN IDs. Accordingly, an onboard apparatus, such as the management apparatus 300, which received the request frame can recognize the frame as a request frame and can identify the number of CAN IDs needed. In this manner, the needed number of CAN IDs can be assigned to the onboard apparatus 201 which transmitted the request frame.

The data structure used in the response frame includes a CAN ID region and a data region. The CAN ID region stores the common ID in the onboard network 400. The data region stores the apparatus ID of the onboard apparatus 201 which requests for CAN ID allocation and the CAN ID allocated to the onboard apparatus 201. The data region stores the number of CAN IDs requested from the onboard apparatus 201. In this manner, the onboard apparatus 201 which received the response frame can recognize the frame as a response frame and can assign one or a plurality of CAN IDs all at once to one onboard apparatus 201.

11. SUPPLEMENT

The embodiments disclosed herein are examples in all respects and are not limiting. The scope of the present disclosure is defined not by the embodiments, but by the scope of the claims, and all modifications that are equivalent to or within the scope of the claims are included.

FIG. 2
201_1~201_7 ONBOARD APPARATUS
202 OUTSIDE-VEHICLE COMMUNICATION UNIT
203 CENTRAL APPARATUS
300 MANAGEMENT APPARATUS
FIG. 3
300 MANAGEMENT APPARATUS
301 PROCESSOR
302 NON-TRANSITORY MEMORY
303 TEMPORARY MEMORY
304 COMMUNICATION INTERFACE
305 COMMUNICATION MANAGEMENT PROGRAM
306 RELAY TABLE
307 CHANNEL MANAGEMENT TABLE

FIG. 5
201 ONBOARD APPARATUS
211 PROCESSOR
212 NON-TRANSITORY MEMORY
213 TEMPORARY MEMORY
214 COMMUNICATION INTERFACE
215 COMMUNICATION SETTINGS PROGRAM
216 APPARATUS ID
FIG. 6
40 SERVER
401 PROCESSOR
402 NON-TRANSITORY MEMORY
403 TEMPORARY MEMORY
404 COMMUNICATION INTERFACE
405 PROGRAM
406 ID DATABASE
FIG. 7
201 ONBOARD APPARATUS
221 FIRST TRANSMISSION UNIT
222 FIRST RECEPTION UNIT
223 REQUEST FRAME GENERATION UNIT
224 SETTING UNIT
FIG. 8
インターフレームスペース INTERFRAME SPACE
データフレーム DATA FRAME
リセッシブ RECESSIVE
ドミナント DOMINANT
バスアイドル BUS IDLE
コントロールフィールド CONTROL FIELD
データフィールド０～８バイト DATA FIELD 0 TO 8 BYTES
ＣＲＣ シーケンス CRC SEQUENCE
ＣＲＣ デリミタ CRC DELIMITER
ＡＣＫ スロット ACK SLOT
ＡＣＫ デリミタ ACK DELIMITER
FIGS. 9, 13, 14
共通ＩＤ COMMON ID
コントロールフィールド CONTROL FIELD
データフィールド DATA FIELD
装置ＩＤ APPARATUS ID
要求ＩＤ数 REQUEST ID NUMBER
FIG. 10
300 MANAGEMENT APPARATUS
311 SECOND RECEPTION UNIT
312 CONNECTION STATUS DETERMINATION UNIT
313 ID INQUIRY UNIT
314 RESPONSE FRAME GENERATION UNIT
315 SECOND TRANSMISSION UNIT
316 OUTPUT COMMAND UNIT
FIGS. 11, 12
チャンネル CHANNEL
装置ＩＤ APPARATUS ID
FIG. 15
スタート START
S101 HAS CAN ID BEEN SET?
S102 READ OUT APPARATUS ID
S103 GENERATE REQUEST FRAME
S104 TRANSMIT REQUEST FRAME
S105 RECEIVE RESPONSE FRAME
S106 HAS NORMAL RESPONSE FRAME BEEN RECEIVED?
S107 SET CAN ID
エンド END

FIG. 16

スタート START
S201 RECEIVE REQUEST FRAME
S202 IS THERE AN ABNORMALITY IN APPARATUS ID?
S203 SEND REQUEST TO SERVER FOR CAN ID ALLOCATION
S204 RECEIVE ALLOCATED CAN ID
S205 GENERATE NORMAL RESPONSE FRAME
S206 TRANSMIT NORMAL RESPONSE FRAME
S207 REGISTER CAN ID
S208 GENERATE ABNORMAL RESPONSE FRAME
S209 TRANSMIT ABNORMAL RESPONSE FRAME
S210 SEND ERROR OUTPUT COMMAND TO CENTRAL APPARATUS
エンド END

FIG. 17
300 MANAGEMENT APPARATUS
311 SECOND RECEPTION UNIT
312 CONNECTION STATUS DETERMINATION UNIT
314 RESPONSE FRAME GENERATION UNIT
315 SECOND TRANSMISSION UNIT
316 OUTPUT COMMAND UNIT
320 ALLOCATION UNIT

The invention claimed is:

1. A management apparatus configured to assign identification information to an onboard apparatus connected to an onboard network, comprising:
a reception unit configured to receive, from an onboard apparatus, a request frame with identification information assigned including a unique ID for the onboard apparatus;
a generation unit configured to generate a response frame including identification information allocated to the request frame received by the reception unit;
a connection status determination unit configured to determine whether or not a correspondence relationship between the unique ID included in the request frame received by the reception unit and a channel of a network bus that transmitted the request frame match; and
a transmission unit configured to transmit the response frame generated by the generation unit to the onboard apparatus which is a transmission source of the request frame.

2. The management apparatus according to claim 1, wherein the request frame further includes the number pieces of requested identification information, and
the response frame includes different identification information corresponding to the number.

3. The management apparatus according to claim 1, wherein the response frame includes a normal response frame and an abnormal response frame,
the generation unit, in a case where the identification information is allocated, generates the normal response frame including the allocated identification information,
the generation unit, in a case where the identification information is not allocated, generates the abnormal response frame not including the identification information, and
the transmission unit transmits the normal response frame or the abnormal response frame generated by the generation unit to the onboard apparatus which is the transmission source.

4. The management apparatus according to claim 3, further comprising:
a storage unit configured to store a correspondence table indicating the correspondence relationship between the unique ID of an onboard apparatus and the channel of athe network bus which an onboard apparatus connects to; and
the generation unit, in a case where the correspondence relationship between the unique ID included in the request frame and the channel that transmitted the request frame and the correspondence relationship indicated in the table are determined to match by the connection status determination unit, generates the normal response frame, and
the generation unit, in a case where the correspondence relationship between the unique ID included in the request frame and the channel that transmitted the request frame and the correspondence relationship indicated in the table are determined not to match by the connection status determination unit, generates the abnormal response frame.

5. The management apparatus according to claim 1, wherein the request frame includes common identification information which is common identification information in the onboard network and identification information dedicated to identification information allocation.

6. The management apparatus according to claim 5, wherein the request frame further includes an identifier dedicated to requesting the identification information.

7. The management apparatus according to claim 5, wherein the response frame includes the common identification information.

8. The management apparatus according to claim 7, wherein the response frame further includes an identifier dedicated to responding to a request for the identification information.

9. The management apparatus according to claim 1, further comprising:
an allocation unit configured to allocate identification information to the request frame received by the reception unit.

10. A method for allocating identification information for an onboard apparatus connected to an onboard network, comprising:
receiving, via a management apparatus connected to the onboard network and from an onboard apparatus, a request frame with identification information assigned including a unique ID for the onboard apparatus;
generating, via the management apparatus, a response frame including identification information allocated to the received request frame;
determining whether or not a correspondence relationship between the unique ID included in the request frame received by the reception unit and a channel of a network bus that transmitted the request frame match; and
transmitting, via the management apparatus, the generated response frame to the onboard apparatus which is a transmission source of the request frame.

11. An onboard system, comprising:
a management apparatus connected to an onboard network; and
an onboard apparatus connected to the onboard network, wherein the onboard apparatus includes:
a first transmission unit configured to transmit a request frame with identification information assigned including a unique ID for the onboard apparatus, the management apparatus includes:
- a second reception unit configured to receive the request frame transmitted from the onboard apparatus;
- a generation unit configured to generate a response frame including identification information allocated to the request frame received by the second reception unit;
- a connection status determination unit configured to determine whether or not a correspondence relationship between the unique ID included in the request frame received by the reception unit and a channel of a network bus that transmitted the request frame match; and
- a second transmission unit configured to transmit the response frame generated by the generation unit to the onboard apparatus which is a transmission source of the request frame, and the onboard apparatus includes:
- a first reception unit configured to receive the response frame transmitted from the management apparatus; and
- a setting unit configured to set identification information included in the response frame received by the first reception unit as identification information of the onboard apparatus.

12. A data structure used in a request frame for an onboard apparatus connected to an onboard network to request allocation of identification information, comprising:
- an ID region; and
- a data region, wherein the ID region stores common identification information in the onboard network, and
- the data region stores a unique ID for an onboard apparatus which requests allocation of identification information and the number of requests for the identification information.

13. A data structure used in a response frame for responding to a request for identification information allocation by an onboard apparatus connected to an onboard network, comprising:
- an ID region; and
- a data region, wherein the ID region stores common identification information in the onboard network,
- the data region stores a unique ID for an onboard apparatus which requests allocation of identification information and identification information allocated to the onboard apparatus, and
- the data region stores the number of pieces of the identification information requested from the onboard apparatus.

* * * * *